PULSE SEPARATORS

Original Filed Aug. 16, 1962 2 Sheets-Sheet 1

United States Patent Office 3,413,558

Patented Nov. 26, 1968

3,413,558

PULSE SEPARATORS

George C. Kean, Sudbury Hill, Greenford, England, assignor to Rotax Limited, London, England Original application Aug. 16, 1962, Ser. No. 217,382, now Patent No. 3,240,918. Divided and this application June 17, 1965, Ser. No. 464,668
Claims priority, application Great Britain, Nov. 23, 1961, 41,891/61
1 Claim. (Cl. 328—109)

Figure 1:
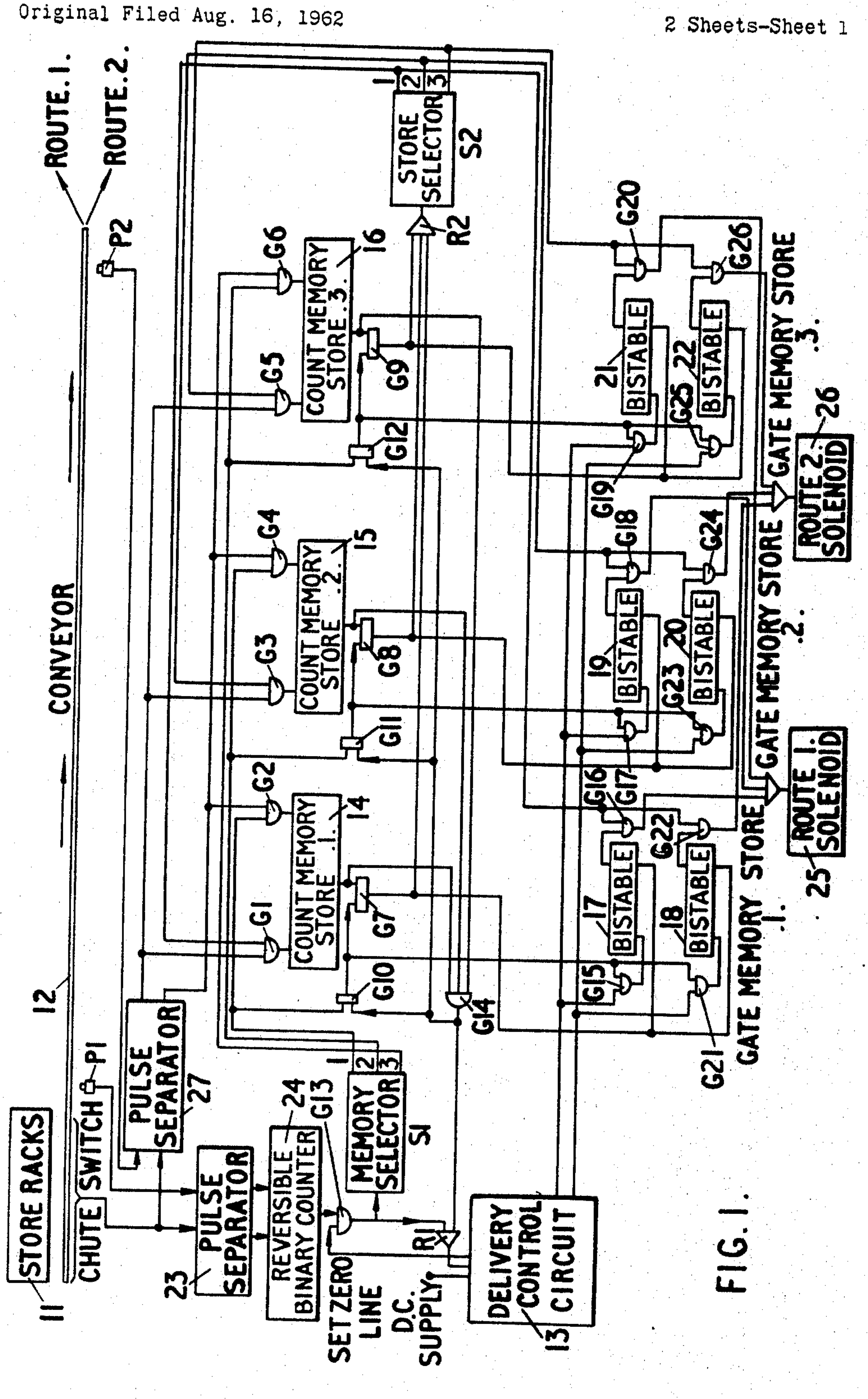

This application is divided out of my application No. 217,382, filed Aug. 16, 1962 and entitled "Apparatus for Dispensing Packaged Goods." The said application No. 217,382 discloses in detail a pulse separator which forms the subject matter of the claim in the present application.

A pulse separator is known in which two parallel circuits are provided, one circuit including a first bistable circuit, a first gate and a first monostable circuit in series, and the other circuit including a second bistable circuit, a second gate and a second monostable circuit in series. The separator is designed to separate pulses from two separate trains of pulses and to pass them on to a further destination which may, for example, be a reversible counter which is operated in opposite directions by pulses in the two trains respectively. The separator further includes an oscillating supply which is connected to the gates in such a way as to switch the gates between conductive and non-conductive states alternately and out of phase with one another, so that when one gate is conducting the other gate will be non-conductive. In use, when a pulse arrives at the first bistable circuit, for example, it switches the first bistable circuit from a first state to a second state in which the first bistable circuit provides an input to the first gate. Assuming that the first gate is conducting, an input is provided to the first monostable circuit, which supplies an output pulse to the reversible counter and resets the first bistable circuit.

If a pulse triggers one of the bistable circuits while its associated gate is non-conductive, the pulse will in effect be stored in the appropriate bistable circuit until the associated gate conducts. Thus, if two pulses arrive at the two bistable circuits substantially simultaneously, they will be separated and passed on to the counter one at a time.

The arrangement described is not by itself satisfactory, because in certain circumstances overlapping pulses will be passed from the monostable circuits to the counter, which could therefore be damaged. Thus, if a pulse arrives at the first bistable circuit just before the first gate becomes non-conductive, and shortly afterwards a pulse arrives at the second bistable circuit just after the second gate becomes conductive, the time interval between the incoming pulses may well be sufficiently small to cause the second monostable circuit to operate before the first monostable circuit ceases to operate.

A proposal which successfully prevents overlap is to place a differentiating circuit between the oscillating supply and the gates. Thus, assuming that the oscillating supply is a square-wave source which switches the first gate on during the positive half-cycles and switches the second gate on during the negative half-cycles, then the differentiating circuit has the effect of ensuring that the first gate is switched on only for a short period at the commencement of each positive half-cycle, and that the second gate is switched on only for a short period at the commencement of each negative half-cycle. At other times, both gates are off, and the monostable circuits are chosen so that they can complete their operation while the gates are off, thereby preventing any overlap of output pulses.

This proposal has two disadvantages. Firstly, it requires an additional network in the separator, namely the differentiating circuit, and in many instances the need to use a differentiating circuit restricts the flexibility of the arrangement, particularly where the separator forms part of a more complex system. Secondly, by virtue of using the differentiating circuit, the bistable circuits may have to store pulses for relatively long periods of time. Thus, a pulse arriving at the first bistable circuit just after the first gate is turned off will have to be stored for most of the positive half-cycle and all of the negative half-cycle of the square wave source, and during this period any further pulses arriving at the first bistable circuit are lost.

The present invention overcomes the difficulties resulting from using the differentiating circuit in a particularly simple but ingenious manner, whilst at the same time still ensuring that output pulses will not overlap. This is done by connecting the first and second monostable circuits to the second and first gates respectively, so that when a monostable circuit in one series circuit is operating, the gate in the other series circuit will be held off irrespective of the state of the square-wave source. Thus, all pulses will be separated, and the maximum storage time will be less than in the arrangement using the differentiating circuit.

Figure 2:
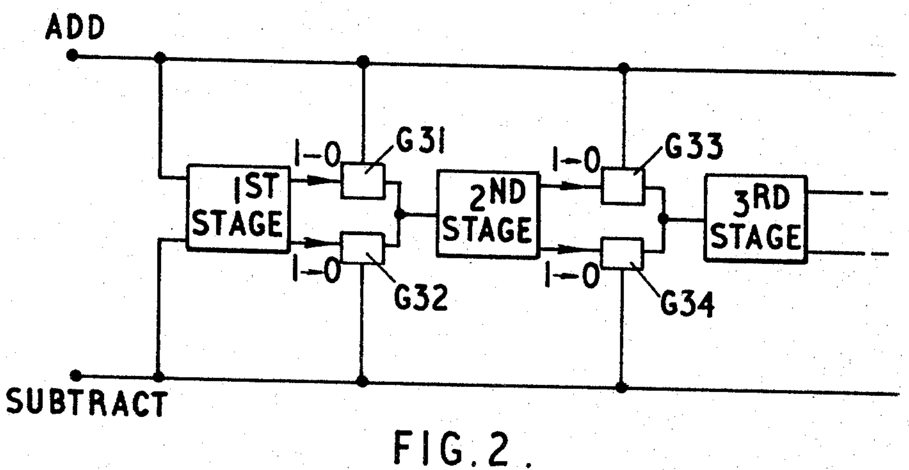
Figure 3:
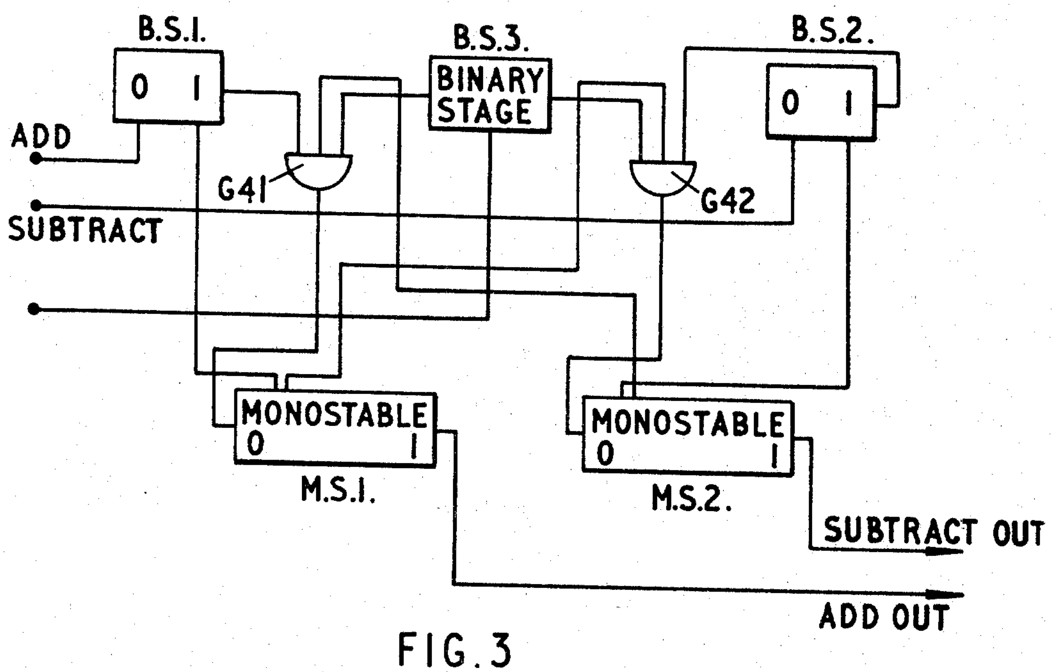

An example of the invention is illustrated in the accompanying drawings in which FIGURE 1 is a block diagram, FIGURE 2 is a detail of part of FIGURE 1, and FIGURE 3 illustrates a pulse separator used in FIGURE 1 and forming the subject matter of this invention.

The example illustrated is intended for use particularly with apparatus for delivering predetermined numbers of each of a plurality of packages of different goods from store racks onto a conveyor in accordance with the reading on a punched card. In FIGURE 1 the store racks and conveyor are shown at 11 and 12 respectively, whilst the electrical circuitry for controlling the delivery of each order to the conveyor is indicated at 13.

The present apparatus is designed to deliver each order to one of two destinations in accordance with a reading on the punched card which was inserted in the control circuit 13 to cause the order to be delivered. It will be appreciated that although only two possible routes are illustrated it is possible to provide more routes, with suitable modifications to the apparatus.

The apparatus shown is designed to enable a maximum of three orders to be present on the conveyor 12 at any one time. For this purpose three count memory stores 14, 15, 16 are provided, these stores being in operation successively under the control of a memory selector S1. The stores 14, 15, 16 are reversible binary counters, and are described more fully with reference to FIGURE 2. In addition, three gate memory stores are provided, these stores serving to determine the route to be taken by an order. The gate memory stores are operated in synchronism with the stores 14, 15, 16 by means of a store selector S2, and are constituted by three pairs of bistable circuits 17, 18, 19, 20, 21 and 22 with associated AND gates G15, G16, G21, G22; G17, G18, G23, G24; and G19, G20, G25, G26 respectively.

At the commencement of operation the selectors S1, S2 are automatically set to energise the lines 1 only. When an order is delivered onto the conveyor 12, switches associated with chutes containing the articles are operated to produce a number of pulses corresponding to the number of articles in the particular order. These pulses are fed through a pulse separator 23 (to be described) to a reversible binary counter 24, and are also fed through a second similar pulse separator 27 to three AND gates G2, G4, G6 which receive in addition inputs from the lines 1, 2, 3. Since only the line 1 is energised, the pulses will be fed into the store 14.

As soon as an order is fed onto the conveyor 12, it starts to pass a photocell P1 which provides pulses which are fed to the counter 24 to operate the counter in the reverse direction. When the counter 24 reaches its zero reading, a pulse is fed through an AND gate G13 to the memory selector S1, stepping the latter one position so that the line 2 is now energised and the next order is fed into the store 15. Similarly a third order will be fed into the store 16.

When the stores 14, 15, 16 are full, thre signals are fed to an AND gate G14, which then produces an output which is fed through an OR gate R1 to the circuit 13, and serves to prevent further operation of the circuit 13 until one of the stores 14, 15, 16 is empty. The gate R1 also receives a signal from the gate G13, so that delivery of a new order cannot be started until the previous order has passed the photocell P1.

The gate G13 also receives a signal from the circuit 13 only when an order is completed, thereby preventing false operation of the apparatus in the event of a chute being empty.

Each punched card has a hole therein in one of two positions depending upon the route to be taken by the order on the punched card. The circuit 13 thus provides a signal either to the AND gates G15, G17, G19, or to the gates G21, G23, G25. When the store 14 is being filled, only the gates G15, G21 are open (the gate G10 being normally open), and so one or other of the bistables 17, 18 is switched to its alternative state. Since the line 1 of the selector S2 is energised, one or other of the gates G16, G22 will now produce an output to energise one of a pair of solenoids 25, 26 which operate a gate in the path of movement of goods along the conveyor 12.

When the second and third orders are fed onto the conveyor, one of each pair of bistables 19, 20; 21, 22 will be operated, but this will not affect the solenoids 25, 26 since only the line 1 of the selector S2 is energised and hence G18, G24, G20, G26 are inhibited.

As the goods of the first order are routed through the gate in the appropriate direction they pass a second photocell P2 which feeds pulses through a pulse separator 27 to AND gates G1, G3, G5 which can produce pulses for operating the stores 14, 15, 16 in the opposite manner from the pulses from the gates G2, G4, G6. Since the first order is being counted, only the gate G1 is open. When the first order has passed the photocell P2, the reading of the store 14 will be zero, and at this point the store 14 produces an output which is fed through a normally open gate G7 and an OR R2 to the selector S2, causing the latter to be stepped so that the line 2 is energised. One of the gates G18, G24 now produces an output to re-set the appropriate solenoid 25, 26. This cycle of operations then continues in the manner described, the selector S2 being stepped as successive orders pass the photocell P2.

In the event of an order extending throughout the length of the conveyor and a chute being empty, it is possible for one of the stores 14, 15, 16 to produce an output to step the selector S2 before an order has passed the photo-cell P2. In order to avoid this the stores 14, 15, 16 are connected to the selector S2 through gates G7, G8, G9 respectively which receive signals from the lines 1, 2, 3 of the selector S1. The arrangement is such that the gates G7, G8, G9 are closed when the lines 1, 2, 3 of the selector S1 are energised respectively, thereby preventing stepping of the selector S2 until a complete order has passed the photocell P2. One input to the gates G7, G8, G9 is provided by the outputs of normally open gates G10, G11, G12 respectively. Those gates are closed when the stores 14, 15, 16 are all full, and are necessary to allow stepping of the selector S2 under these conditions. The gates G10, G11 and G12 also prevent inadvertent operation of the gate memory stores.

The preferred form of the counter 24 and the stores 14, 15, 16 is shown in FIGURE 2. Pulses of one polarity are fed to the first stage and to AND gates G31, G33. Each stage is a bistable circuit, and the gates G31, G33 only pass a pulse to the next stage when the previous stage changes from a 1 to a 0 configuration. Similarly, pulses of the opposite polarity are fed to gates G32, G34 and to the first stage. The gates G32, G34 pass a pulse to the next stage only when the first stage changes from a 0 to a 1 configuration. Thus, the pulses of opposite polarity effect adding and subtracting respectively.

The purposes of the pulse separators 23, 27 is to prevent two pulses of opposite polarity from arriving at the counter 24 or store 14, 15, 16 substantially simultaneously, since in such a contingency one pulse may have no effect due to the finite operating time of the bistable circuits. The preferred form of pulse separator is shown in FIGURE 3.

Referring to FIGURE 3, the pulses of opposite polarity, i.e. the "ADD" and "SUBTRACT" pulses, are fed to two bistable circuits BS1, BS2 which are normally in the 01 configuration. A third bistable circuit BS3 is fed from a 50 c.s. supply.

When a pulse is applied to the ADD line, the bistable BS1 is switched to its 10 configuration, and a three-way AND gate G41 receives a 0 from both the bistable BS1 and a monostable circuit MS2. Thus, when the bistable BS3 is switched to the appropriate state, the gate G41 produces an output which operates a monostable circuit MS1 to provide an output from the circuit, and also to inhibit a second three-way AND gate G42 so that the monostable MS2 cannot be switched. When the monostable MS1 reverts to its stable state, it provides a pulse which resets the bistable BS1.

A similar sequence of events takes place on receipt of a SUBTRACT pulse, but if two pulses are received simultaneously they will be separated in time by the output from the bistable BS3, which ensures that only one of the gates G41, G42 can conduct at any time. The connections from the monostable circuits MS1, MS2 to the gates G42, G41 respectively ensure that pulses supplied to the counter do not overlap.

It will be appreciated that a gate for controlling more than two routes may be provided. Moreover, the routes controlled by a two-way gate may themselves be divided by further two-way gates. In this case the readings of the memory units controlling the first gate may be transferred to other memory units for operating the other gates.

It will be understood that the punched card reader constitutes a plurality of switching devices the states of which are determined by the positions of the holes in the punched card. However, the switching devices could be constituted by other means such, for example, as on-off switches. In this case one or more switches would determine the destination of an order. The switches could be re-set for a second order as soon as the first order has passed the photocell P1.

Having thus described my invention what I claim as new and desire to secure by Letters Patent is:

1. A pulse separator for separating pulses from two trains of pulses, comprising a first series circuit including a first bistable circuit, a first gate and a first monostable circuit, the pulses in one train being applied to the first bistable circuit which switches to its alternative state to operate the first monostable circuit provided the first gate is conducting, a second series circuit including a second bistable circuit, a second gate and a second monostable circuit, the pulses in the other train being applied to the second bistable circuit which switches to its alternative state to operate the second monostable circuit provided the second gate is conducting, said monostable circuits providing the output from the separator, an oscillator connected to said gates and rendering them non-conductive alternately, so that only one gate can conduct at a time, means operable as a result of operation of the first and second monostable circuits respectively for switching the first and second bistable circuits to their first state, a connection from the first monostable circuit to the second gate whereby the second gate is held non-conductive while the first monostable circuit is operating, and a connection from the second monostable circuit to the first gate whereby the first gate is held non-conductive while the second monostable circuit is operation..

No references cited.

ARTHUR GAUSS, *Primary Examiner.*

J. D. FREW, *Assistant Examiner.*